(12) United States Patent
Huang

(10) Patent No.: US 9,115,843 B2
(45) Date of Patent: Aug. 25, 2015

(54) HOLDER

(75) Inventor: Hsiao-Chuan Huang, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 96 days.

(21) Appl. No.: 12/509,018

(22) Filed: Jul. 24, 2009

(65) Prior Publication Data

US 2010/0051771 A1 Mar. 4, 2010

(30) Foreign Application Priority Data

Aug. 26, 2008 (TW) ................................ 97215334 U

(51) Int. Cl.
*A47G 1/10* (2006.01)
*F16M 13/00* (2006.01)
*F16M 11/08* (2006.01)
*F16M 13/02* (2006.01)

(52) U.S. Cl.
CPC ............... *F16M 13/00* (2013.01); *F16M 11/08* (2013.01); *F16M 13/02* (2013.01)

(58) Field of Classification Search
CPC .............................. F16M 11/08; F16M 11/02
USPC ........ 248/311.1, 316.1, 316.4, 231.61, 228.5, 248/313, 229.1, 149, 670, 292.12
See application file for complete search history.

(56) References Cited

U.S. PATENT DOCUMENTS

| 440,435 | A | | 11/1890 | O'Neill et al. | |
|---|---|---|---|---|---|
| 909,469 | A | * | 1/1909 | Solberg | 144/307 |
| 5,305,381 | A | * | 4/1994 | Wang et al. | 379/455 |
| 5,398,898 | A | * | 3/1995 | Bever | 248/154 |
| 5,560,578 | A | * | 10/1996 | Schenken et al. | 248/313 |
| 5,695,164 | A | | 12/1997 | Hartmann et al. | |
| 5,903,645 | A | * | 5/1999 | Tsay | 379/455 |
| 6,402,111 | B1 | * | 6/2002 | Stewart et al. | 248/317 |
| 6,478,276 | B1 | | 11/2002 | Louh | |
| 6,966,533 | B1 | * | 11/2005 | Kalis et al. | 248/316.4 |
| 7,296,752 | B2 | | 11/2007 | Carnevali | |
| 2007/0063115 | A1 | * | 3/2007 | Ye | 248/231.61 |
| 2009/0294617 | A1 | * | 12/2009 | Stacey et al. | 248/316.1 |

FOREIGN PATENT DOCUMENTS

| CA | 2 571 212 A1 | 6/2007 |
|---|---|---|
| DE | 298 07 632 U1 | 7/1998 |
| DE | 198 30 270 A1 | 3/1999 |
| DE | 200 18 891 U1 | 1/2001 |
| DE | 20 2005 015 032 U1 | 12/2005 |

* cited by examiner

*Primary Examiner* — Kimberly Wood
(74) *Attorney, Agent, or Firm* — Rabin & Berdo, P.C.

(57) ABSTRACT

A holder including a fixed base, a rotational base, a first arm and a second arm is provided. The rotational base is rotatably disposed on the fixed base and has a supporting plane and two openings. The first arm and the second arm are disposed in the rotational base, and pass through the two openings, respectively, wherein the first arm is coupled with the fixed base. When a hand-held electronic device is located between the first arm and the second arm and is rotated along with the rotational base relative to the fixed base, the fixed base drives the first arm to move relative to the rotational base so as to hold the hand-held electronic device by the first arm and the second arm.

13 Claims, 4 Drawing Sheets

HOLDER

This application claims the benefit of Taiwan application Serial No. 97215334, filed Aug. 26, 2008, the subject matter of which is incorporated herein by reference.

BACKGROUND OF THE INVENTION

1. Field of the Invention

The application relates in general to a holder, and more particularly to a holder for holding a hand-held electronic device.

2. Description of the Related Art

There are a large variety of electronic devices available in the market. Particularly, the hand-held electronic devices, such as notebook computers, mobile phones, personal digital assistants (PDA), portable game machines, translation machines, multi-media players (MP3, MP4), and vehicle navigation devices, provide the users with versatile choices of operation.

Most of the hand-held electronic devices are small in size and allow the user to hold and operate with one hand or two hands. Take the vehicle navigation device for example. The vehicle navigation device provides the user with instant information of the traffic when the user is driving. As the user drives his/her car with both hands, the vehicle navigation device has to be fixed at somewhere near the driver's seat. Although the vehicle navigation device can be fixed in a holder currently available in the market, the vehicle navigation device still wobbles during the movement of the vehicle and damage would likely occur.

SUMMARY OF THE INVENTION

The application is directed to a holder. When the holder and the hand-held electronic device are rotated, the arm is driven to move so as to firmly hold the hand-held electronic device.

According to the present application, a holder including a fixed base, a rotational base, a first arm and a second arm is provided. The rotational base is rotatably disposed on the fixed base and has a supporting plane and two openings. The first arm and the second arm are disposed in the rotational base, and pass through the two openings, respectively, wherein the first arm is coupled with the fixed base. When a hand-held electronic device is located between the first arm and the second arm and is rotated along with the rotational base relative to the fixed base, the fixed base drives the first arm to move relative to the rotational base so as to hold the hand-held electronic device by the first arm and the second arm.

The application will become apparent from the following detailed description of the preferred but non-limiting embodiments. The following description is made with reference to the accompanying drawings.

DETAILED DESCRIPTION OF THE INVENTION

Figure 1A:
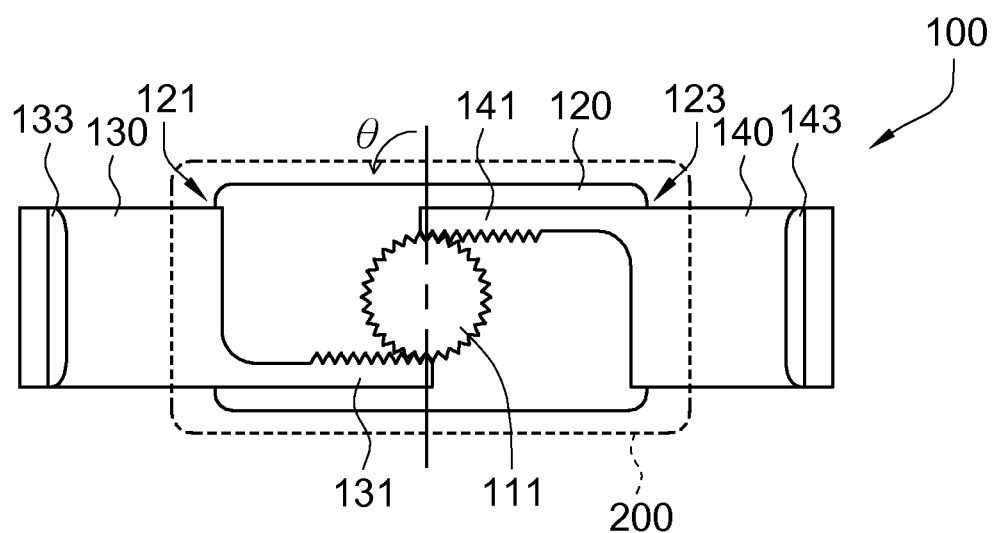
FIGS. 1A~1B show a holder before and after being operated according to an embodiment of the invention.
Figure 1B:
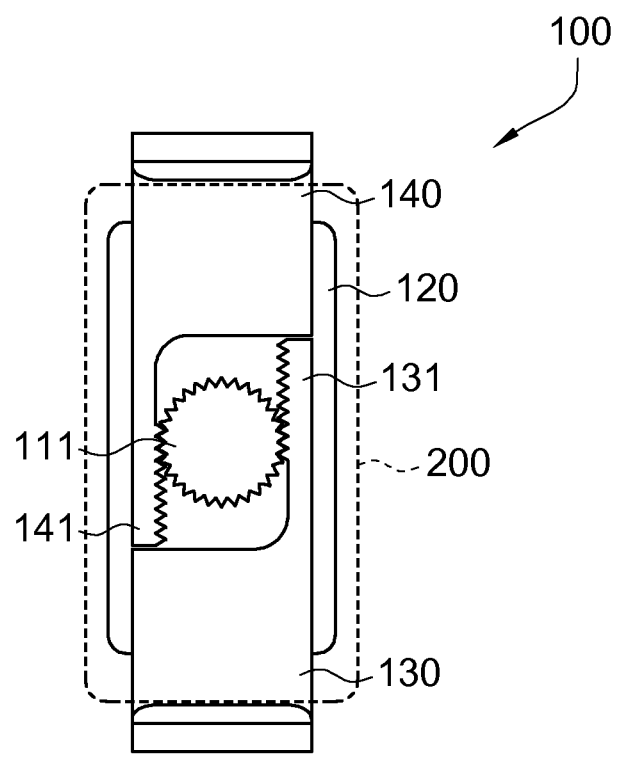
Figure 2:
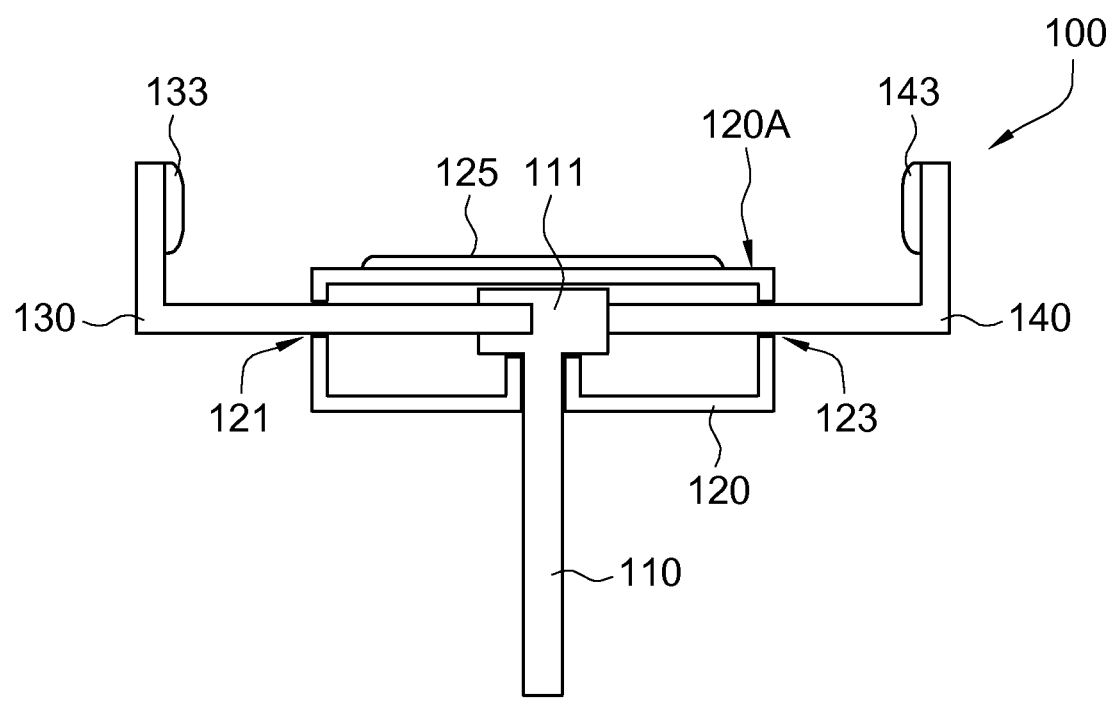
FIG. 2 shows a side view of the holder of FIG. 1A.

Referring to FIGS. 1A~1B, a holder before and after being operated according to an embodiment of the invention is shown. Referring to FIG. 2, a side view of the holder of FIG. 1A is shown. The holder 100 includes a fixed base 110, a rotational base 120, a first arm 130 and a second arm 140. The rotational base 120 is rotatably disposed on the fixed base 110 and has a supporting plane 120A and two openings 121 and 123. The two openings 121 and 123 are located on two opposite sides of the supporting plane 120A. The first arm 130 and the second arm 140 are disposed in the rotational base 120, and respectively pass through the two openings 121 and 123. Moreover, the first arm 130 and the second arm 140 are coupled with the fixed base 110. When a hand-held electronic device 200 is located between the first arm 130 and the second arm 140 and is rotated along with the rotational base 120 relative to the fixed base 110, the fixed base 110 drives the first arm 130 and the second arm 140 to move relative to the rotational base 120 so as to adjust the distance between the first arm 130 and the second arm 140 for holding the hand-held electronic device 200. As indicated in FIG. 1B, the first arm 130 and the second arm 140 to hold the two short sides of the hand-held electronic device 200 however the application is not limited thereto. In other embodiments, the first arm 130 and the second arm 140 can also hold the long sides of the hand-held electronic device 200.

The fixed base 110 drives the first arm 130 and the second arm 140 to move by different ways. As indicated in FIG. 1A, the fixed base 110 has a gear 111 fixed in the fixed base 110. The first arm 130 has a first rack 131, and the second arm 140 has a second rack 141, wherein, the first rack 131 and the second rack 141 are located in the rotational base 120 and respectively engaged with the two opposite sides of the gear 111. The gear 111 is non-rotatably fixed on a rotation center of the rotational base 120.

As indicated in FIG. 2, the first arm 130 and the second arm 140 both have one end bent towards the supporting plane 121, so that the first arm 130 and the second arm 140 both form an L-shaped structure. Preferably, the rotational base 120 further has a soft pad 125 disposed on the supporting plane 120A to generate a larger friction between the soft pad 125 and the hand-held electronic device 200 so that the hand-held electronic device 200 will not come off easily. Also, the exposed end of the first arm 130 and that of the second arm 140 respectively have a soft pad 133 and a soft pad 143. The soft pads 125, 133 and 143 can be made from rubber for enabling the holder 100 to hold the hand-held electronic device 200 tightly.

When the hand-held electronic device 200 is slightly pressed on the rotational base 120 through the soft pad 125 disposed on the supporting plane 120A as indicated in FIG. 1A, the hand-held electronic device 200 is then rotated to an angle e along with the rotational base 120. When the rotational base 120 is rotated relative to the fixed base 110 and the gear 111, the gear 111 drives the first rack 131 and the second rack 141 to respectively move in opposite directions. That is, the first rack 131 and the second rack 141 will move in the rotational base 120 so as to increase or decrease the distance between the first arm 130 and the second arm 140. As indicated in FIG. 1B, the rotation angle e of the rotational base 120 is about 90 degrees. The first arm 130 and the second arm 140 are moved closer to each other in opposite directions, and at last, the first arm 130 and the second arm 140 hold the two opposite sides of the hand-held electronic device 200 and tightly hold the hand-held electronic device 200 through the soft pads 133 and 143, which further reinforce the holding effect and effectively prevent the hand-held electronic device 200 from wobbling.

Figure 3A:
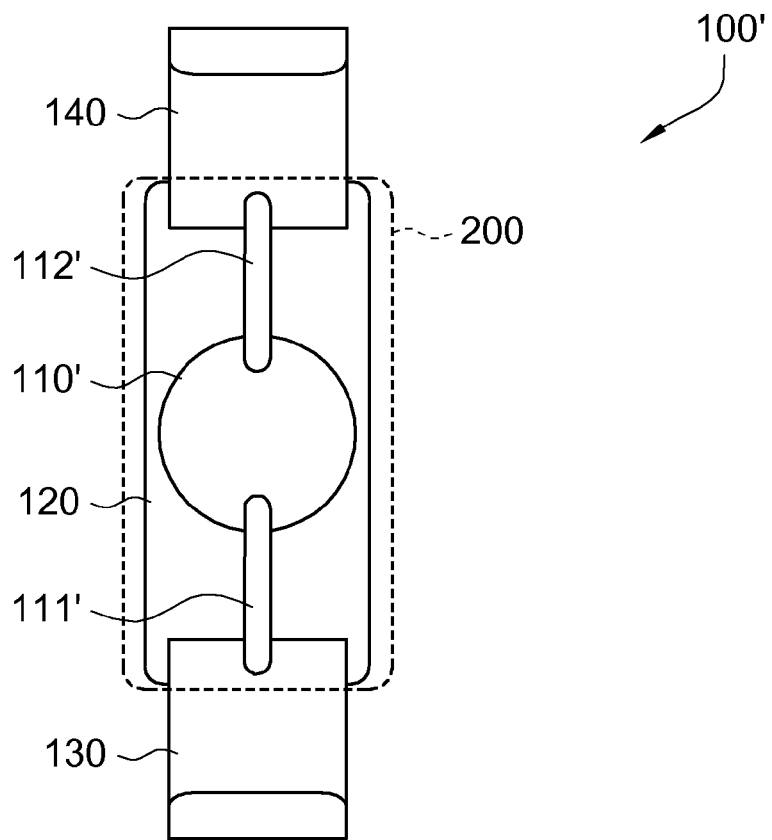
FIGS. 3A~3B show a holder before and after its arms are driven by swinging rods.
Figure 3B:
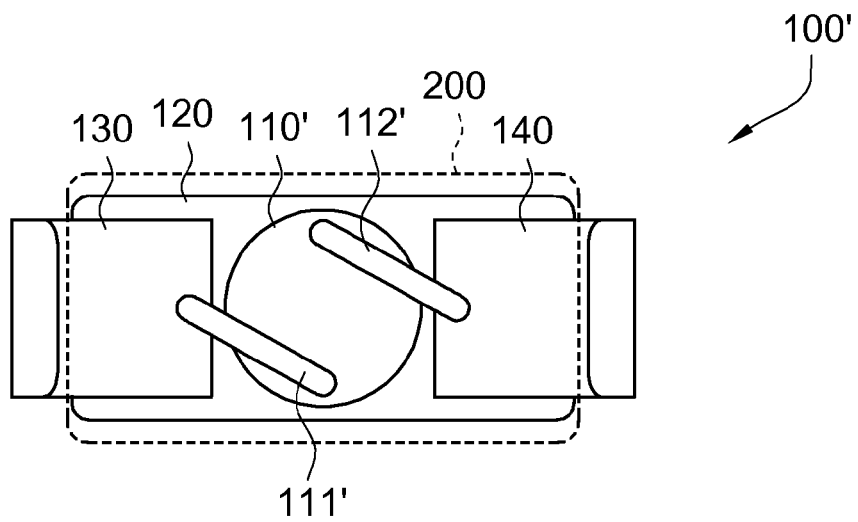

In the above embodiment, the rotational base 120 of the holder 100 is rotated from a first state to a second state on the same plane so as to hold the hand-held electronic device 200, but the application is not limited thereto. For example, the rotational base 120 of the holder 100 can also be rotated from a second state to a first state on the same plane to hold the hand-held electronic device 200 (as indicated in FIGS. 3A-3B). Or, the rotational base 120 of the holder 100 is rotated from a tilting state to another tilting state, a first state or a second state on the same plane so as to hold the hand-held electronic device 200. Other mechanical design can also be used for moving the first arm 130 and the second arm 140 apart from the gear 111, the first rack 131 and the second rack 141 mentioned above.

Figure 4:
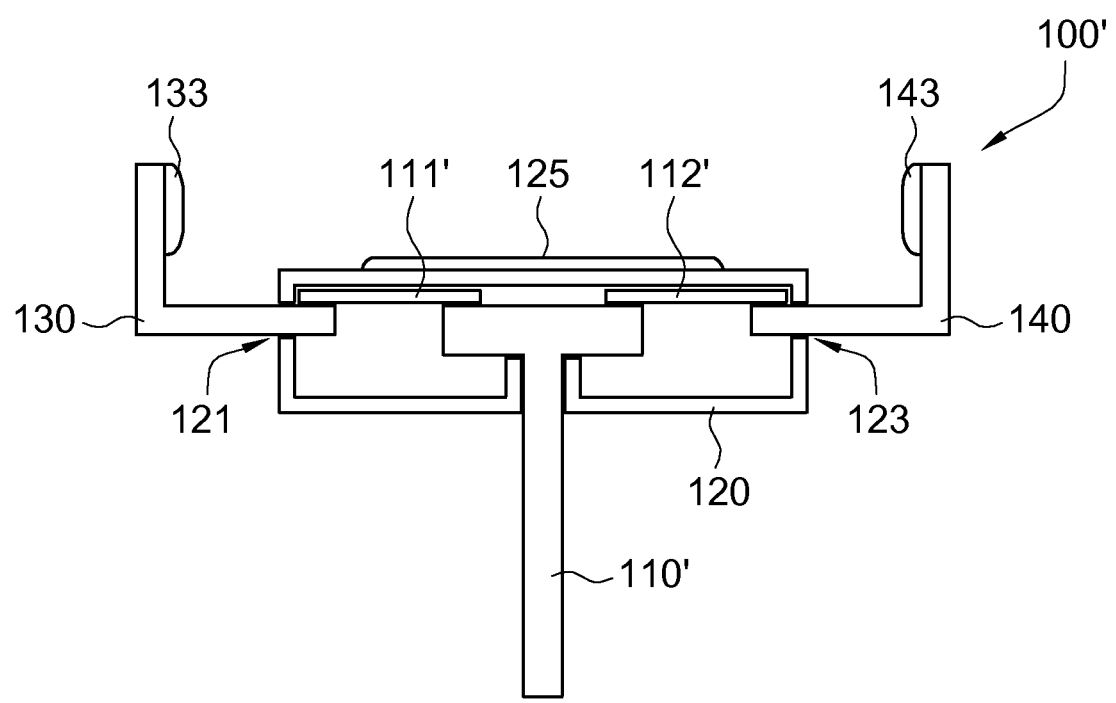
FIG. 4 shows a side view of the holder of FIG. 3A.

Referring to FIGS. 3A-3B, a holder before and after its arms are driven by swinging rods is shown. Referring to FIG. 4, a side view of the holder of FIG. 3A is shown. As indicated in FIG. 3A, the holder 100' includes a first swinging rod 111' and a second swinging rod 112'. The first swinging rod 111' is coupled with the fixed base 110' and the first arm 130. The second swinging rod 112' is coupled with the fixed base 110' and the second arm 140. As indicated in FIGS. 3A, 3B, when the hand-held electronic device 200 is rotated along with the rotational base 120 relative to the fixed base 110' clockwise, the position of the ends of the first swinging rod 111' and the second swinging rod 112'coupled with the fixed base 110' does not change, but the ends of the first swinging rod 111' and the second swinging rod 112' coupled with the first arm 130 and the second arm 140 will drive the first arm 130 and the second arm 140 to move closer to each other towards the rotational base 120 along with the rotation of the rotational base 120. Thus, the distance between the first arm 130 and the second arm 140 is adjustable. When the hand-held electronic device 200 and the rotational base 120 are rotated to 90 degrees, the holder 100' holds the hand-held electronic device 200. Likewise, although the holder 100' in FIGS. 3A, 3B holds the short sides of the hand-held electronic device 200, the holder 100' can also hold the two long sides of the hand-held electronic device 200.

In the present embodiment of the application, the distance between the two arms is adjusted by moving the two arms relative to the rotational base. However, the application is not limited thereto. In other embodiments, the distance between the two arms can be adjusted by fixing one of the two arms but moving the other arm. Unlike the above embodiment in which two racks or two swinging rods are used for adjusting the distance between the two arms, the invention can use only one rack or one swinging rod.

According to the holder disclosed in the above embodiment of the application, the hand-held electronic device is placed on the rotational base, and is rotated along with the rotational base to drive the arm to move for adjusting the distance between the two arms. When the two arms are closer to each other, the two arms press the two opposite sides of the hand-held electronic device so as to hold the hand-held electronic device and reduce the wobbling thereof. For example, the holder of the above embodiment can hold a hand-held electronic device such as a vehicle navigation device to avoid the vehicle navigation device coming off the holder when the vehicle is driven unsteadily on the road.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A holder for holding a hand-held electronic device, comprising:
   a fixed base having a gear fixed at a top of the fixed base;
   a rotational base rotatably disposed so as to rotate relative to the fixed base, wherein the gear is within the rotational base and the rotational base has a supporting plane and two openings; and
   first and second arms extended outward from the rotational base and passing through the two openings respectively, wherein the first arm has a first rack disposed in the rotational base and engaged with the gear;
   wherein, when the hand-held electronic device is located between the first arm and the second arm and is rotated along with the rotational base, the rotational base rotates relative to the fixed base by rotating only the rotational base, so that the first rack is rotated around the gear to move the first arm relative to the second arm so as to hold the hand-held electronic device by the first arm and the second arm.

2. The holder according to claim 1, wherein the two openings are symmetrically disposed.

3. The holder according to claim 1, wherein the second arm has a second rack disposed in the rotational base and engaged with the gear.

4. The holder according to claim 1, wherein the first arm and the second arm both have one end bent toward the supporting plane.

5. The holder according to claim 4, wherein the first arm and the second arm both are an L-shaped structure.

6. The holder according to claim 1, wherein the rotational base further has a soft pad disposed on the supporting plane.

7. The holder according to claim 1, wherein each of the first arm and the second arm has a soft pad that leans against the hand-held electronic device.

8. The holder according to claim 1, wherein the hand-held electronic device is rotated along with the rotational base to 90 degrees.

9. The holder according to claim 1, wherein the hand-held electronic device is a vehicle navigation device, the first arm and second arm press two opposite sides of the hand-held electronic device so as to hold the hand-held electronic device.

10. A holder for holding a hand-held electronic device, comprising:
    a fixed base;
    a rotational base rotatably disposed on the fixed base, wherein the rotational base has a supporting plane;
    a first arm and a second arm disposed within the rotational base; and
    a first swinging rod coupled with the fixed base and the first arm;
    wherein when the hand-held electronic device is located between the first arm and the second arm and is rotated along with the rotational base relative to the fixed base, the first swinging rod is rotated around the fixed base to move the first arm close to the second arm so as to hold the hand-held electronic device by the first arm and the second arm.

11. The holder according to claim 10, further comprising a second swinging rod coupled with the fixed base and the second arm.

12. The holder according to claim 10, wherein the hand-held electronic device is rotated along with the rotational base to 90 degrees.

13. The holder according to claim 10, wherein the hand-held electronic device is a vehicle navigation device, the first arm and second arm press two opposite sides of the hand-held electronic device so as to hold the hand-held electronic device.

* * * * *